United States Patent [19]

Hitachi et al.

[11] Patent Number: 5,374,402
[45] Date of Patent: Dec. 20, 1994

[54] METAL-MADE HONEYCOMB CARRIER BODY

[75] Inventors: Yuzo Hitachi; Haruo Serizawa, both of Shizuoka, Japan

[73] Assignee: Usui Kokusai Sangyo Kaisha, Ltd., Japan

[21] Appl. No.: 45,072

[22] Filed: Apr. 12, 1993

[30] Foreign Application Priority Data

Apr. 27, 1992 [JP] Japan ................. 4-131356

[51] Int. Cl.$^5$ .............................. F01N 3/28
[52] U.S. Cl. ...................... 422/177; 422/180; 502/439; 502/527; 55/DIG. 30; 60/299
[58] Field of Search ............. 422/177–180; 502/439, 527, 338; 55/DIG. 30; 428/592, 593, 614; 60/299

[56] References Cited

U.S. PATENT DOCUMENTS

| | | | |
|---|---|---|---|
| 4,273,681 | 6/1981 | Nonnenmann | 502/527 |
| 5,153,167 | 10/1992 | Saito et al. | 502/527 |
| 5,215,722 | 6/1993 | Nishizawa | 422/174 |

FOREIGN PATENT DOCUMENTS

| | | | |
|---|---|---|---|
| 61-66610 | 5/1986 | Japan | . |
| 62-158117 | 10/1987 | Japan | . |
| 63-105221 | 5/1988 | Japan | . |
| 63-182038 | 7/1988 | Japan | . |
| 64-30651 | 2/1989 | Japan | . |
| 2258903 | 9/1990 | Japan | 422/174 |

*Primary Examiner*—Robert J. Warden
*Assistant Examiner*—Hien Tran
*Attorney, Agent, or Firm*—Lowe, Price, LeBlanc & Becker

[57] ABSTRACT

A metal-made honeycomb carrier body is provided for carrying thereon an exhaust gas cleaning catalyst. The carrier body has been formed by superposing a planar metal band made of a metal sheet and a corrugated band made from another metal sheet one over the other in a contiguous relation and defines a number of network-patterned gas flow passages along a central axis thereof. At one of opposite axial ends of the honeycomb carrier body, one of the planar band and the corrugated band extends outwardly relative to the other band.

7 Claims, 6 Drawing Sheets

METAL-MADE HONEYCOMB CARRIER BODY

BACKGROUND OF THE INVENTION

1) Field of the Invention

This invention generally relates to a metal-made honeycomb carrier body useful in an automotive exhaust gas cleaning device in order to carry an exhaust gas cleaning catalyst thereon.

More specifically, this invention provides a metal-made honeycomb carrier body, a principal component of an exhaust gas cleaning device of the above-mentioned type employed under severe conditions, which has been improved in durability against deformation and breakage which would occur by expansion and stress under heat.

2) Description of the Related Art

Conventionally-known catalyst carrier bodies for exhaust gas cleaning devices of the above-mentioned type include ceramic-made monolithic carrier bodies making use of a ceramic material such as cordierite and metal-made monolithic carrier bodies.

With a view toward improving certain drawbacks of ceramic-made monolithic carrier bodies, a great deal of research and development work is under way especially in recent years on metal-made monolithic carrier bodies from the viewpoints of mechanical strength, durability, flow resistance, purification efficiency (device size reduction) and the like.

A metal-made exhaust gas cleaning device of the above-mentioned type is generally constructed of a metal-made honeycomb carrier body and a cylindrical metallic casing. The metal-made honeycomb carrier body has been formed, for example, by superposing a planar metal band made of a heat-resistant steel sheet and a corrugated band made from a similar steel sheet one over the other in a contiguous relation and then rolling them into a spiral form or by stacking such planar bands and corrugated bands in layers, thereby defining a number of network-patterned gas flow passages along a central axis of the resulting carrier body. The network-patterned gas flow passages may hereinafter be called simply the "cells", while the metal-made honeycomb carrier body will hereinafter be called the "metal-made honeycomb carrier body" or simply the "honeycomb carrier body". The cylindrical metallic casing is open at opposite ends thereof so that the honeycomb carrier body can be inserted and fixed in the casing.

The honeycomb carrier body and the metallic casing are firmly fixed together by brazing or welding so that the resulting exhaust gas cleaning device can withstand thermal expansion and thermal stress, which occur because of the high temperature of exhaust gas itself and exothermic reactions of exhaust gas induced by a cleaning catalyst, and also vibrations during running of an associated automotive vehicle. Needless to say, the planar band and the corrugated band, which make up the honeycomb carrier body, can be fixed together at points of contact therebetween by various methods.

Exhaust gas cleaning devices, each of which is made of the above-described conventional honeycomb carrier body and a metallic casing, cannot however withstand long-term use for the reasons to be described next.

Based on thermal expansion and thermal stress which are produced in an atmosphere of the high temperature of exhaust gas itself and the heat generated through catalytic reactions of unburnt gas, significant deforming force occurs especially in a direction perpendicular to an axial direction (i.e., the direction in which exhaust gas flows in and passes) of the honeycomb carrier body, to say nothing of the axial direction. The direction perpendicular to the axial direction will hereinafter be called the "radial direction of the honeycomb carrier body". This deforming force propagates in both the axial and radial directions of the honeycomb carrier body and gives deleterious effects to the honeycomb carrier body. Described more specifically, such deleterious effects include so-called "filming out" of a central part of the honeycomb carrier body in the axial direction of the honeycomb carrier body, that is, the phenomenon that the central part of the honeycomb carrier body extends out to a downstream side relative to the remaining part of the honeycomb carrier body) as viewed in the direction of exhaust gas. In the radial direction, on the other hand, because of a temperature gradient between the central part of the honeycomb carrier body and its outer peripheral part, deforming force propagates close to the outer peripheral part of the honeycomb carrier body or close to faces of contact between an outer peripheral wall of the honeycomb carrier body and an inner peripheral wall of the metallic casing through the component members (the planar band and the corrugated band) of the honeycomb carrier body.

In the course of the propagation of the thermal deforming force, the component members of the honeycomb carrier body may be broken or buckled in the radial direction of the honeycomb carrier body and, because the thermal deforming force concentrates especially near the outer peripheral wall of the honeycomb carrier body or around faces of contact between the outer peripheral wall of the honeycomb carrier body and the inner peripheral wall of the metallic casing, the planar and/or corrugated bands forming the honeycomb carrier body at such places also undergo substantial cracking, breakage and buckling and separation or detachment takes place at points of contact between the respective bands or at faces of contact between the honeycomb carrier body and the metallic casing. Since the exhaust gas cleaning device is used under severe vibrations on an automotive vehicle as typified by a motor cycle, these drawbacks are aggravated further.

As measures for the improvement of the durability of such a honeycomb carrier body especially in the radial direction under thermal deforming force, many proposals have been made including the followings:

i) Japanese Utility Model Application Laid-Open (Kokai) Nos. SHO 61-66610 and 62-158117, Japanese Patent Application Laid-Open (Kokai) No. SHO 63-105221, etc. disclose a honeycomb carrier body having a conical concavity or a conical convexity at one end portion thereof, especially at the end portion located on an upstream side as viewed in the direction of exhaust gas.

They seem to be effective in making an exhaust gas stream uniform relative to the honeycomb carrier body or in preventing the so-called "filming out", but are not effective against buckling, cracking and/or breakage of the members forming the honeycomb carrier body (i.e., the planar band and the corrugated band) observed especially at the end portions of the honeycomb carrier body.

ii) Japanese Patent Application Laid-Open (Kokai) No. SHO 63-182038 discloses a technique for fabricating a honeycomb carrier body from a first corrugated band and a second corrugated band having mutually-different wavelengths (periods) λ and waveheights (amplitudes) A. Namely, it is attempted to withstand radial pressure and expansion, which occur through thermal deformation cycles, by using a first corrugated band having a relatively large period and amplitude and a second corrugated band having a relatively small period and amplitude.

In the invention disclosed in the above patent publication, however, the first and second corrugated bands are not maintained in contact in a ridge-to-ridge (or groove-to-groove) relationship or in a ridge-to groove relationship (needless to say, the former relationship is preferred). Even if the first and second corrugated bands are fixed together by brazing at points of contact therebetween, they are caused to separate from each other under large thermal deforming force so that various drawbacks will be developed in association with such separation.

iii) Japanese Patent Application Laid-Open (Kokai) No. SHO 64-30651 discloses a technique for fabricating a honeycomb carrier body from a planar band and a corrugated band. The planar band has curved surface portions formed in advance so that the planar band can be brought into face-to-face contact with the curved surface portions (the ridges and grooves) of the corrugate band. The planar band may hence be regarded as a kind of corrugated band. A primary object is to bring both the bands into face-to-face (inner/outer) contact at their respective convex/concave surface portions, thereby making it possible to improve the strength of joining and also to save expensive λ-alumina upon wash coating. Moreover, the planar band is in a wavy form as described above so that radial thermal deforming force can be reduced by the curved surface portions.

The invention of the above patent publication is however accompanied by the drawback that, because the planar band and the corrugated band are in face-to-face contact, the ability of the planar band to absorb and reduce thermal deforming force has been lowered.

In the conventional exhaust gas cleaning device of the above-described type, a common concept is employed especially to make its honeycomb carrier body sufficiently resistant to thermal deforming force, that is, to simply fix the planar band and the corrugated band firmly together, both the bands forming the honeycomb carrier body, or the outer peripheral wall of the honeycomb carrier body and the inner peripheral wall of the metallic casing firmly together. However this approach has to be modified.

SUMMARY OF THE INVENTION

With a view toward overcoming the above-described drawbacks of the conventional exhaust gas cleaning devices, the present inventors have proceeded with an extensive investigation. In a metal-made honeycomb carrier body of the above-described type, buckling, cracking and/or breakage of its component members are observed especially at the end portions of the honeycomb carrier body because of deforming force resulting from large thermal stress applied to the honeycomb carrier body. For the improvement of these problems, a measure has been investigated.

As a result, it has been found that, when members forming a honeycomb carrier body, namely, a planar band made of a heat-resistant metal sheet and a corrugated band made from a heat-resistant metal sheet are stacked with one of the bands extending out relative to the other at one end portion of the resulting honeycomb carrier body instead of making them flush relative to each other, the honeycomb carrier body can effectively absorb or dissipate deforming force which is produced based on thermal stress applied inside the honeycomb carrier body and concentrated at both end portions of the honeycomb carrier body.

An object of the present invention is to provide a honeycomb carrier body excellent in durability, especially a honeycomb carrier body having excellent durability at both end portions of the honeycomb carrier body at which end portions deforming force concentrates and accumulates based on thermal stress.

In other words, an object of the present invention is to provide a honeycomb carrier body excellent in durability which, owing to reinforcement at both end portions thereof, can effectively overcome the drawback that cracks and breakage occur at the end portions and the entire honeycomb carrier body is broken too early as a result of such cracks and breakage.

In one aspect of the present invention, there is thus provided a metal-made honeycomb carrier body for carrying thereon an exhaust gas cleaning catalyst, said carrier body having been formed by superposing a planar metal band made of a metal sheet and a corrugated band made from another metal sheet one over the other in a contiguous relation and defining a number of network-patterned gas flow passages along a central axis thereof, characterized in that, at one of opposite axial ends of the honeycomb carrier body, one of the planar band and the corrugated band extends outwardly relative to the other band.

In the metal-made honeycomb carrier body according to the present invention which carrier body is a principal element of an exhaust gas cleaning device, one of the planar and corrugated bands which are component members of the carrier body extends outwardly relative to the other band at at least one axial end thereof. The free edge of the planar band (or the corrugated band) at the one axial end of the honeycomb carrier body can therefore effectively absorb or dissipate large deforming force which occurs based on (radial and axial) thermal stress produced inside the honeycomb carrier body.

As a consequence, the present invention can effectively prevent buckling, cracking or breakage of the component members of the honeycomb carrier body and also separation or detachment of the component members from each other at points of contact therebetween.

In association with the advantageous effects described above, it is also possible to effectively prevent separation or chipping of catalyst carrier layers which are formed on walls of the honeycomb carrier body and are employed to support thereon an exhaust gas cleaning catalyst.

BRIEF DESCRIPTION OF THE DRAWINGS

The above and other objects, features and advantages of the present invention will become apparent from the following description and the appended claims, taken in conjunction with the accompanying drawings, in which:

DETAILED DESCRIPTION OF THE INVENTION AND PREFERRED EMBODIMENTS

Figure 1:
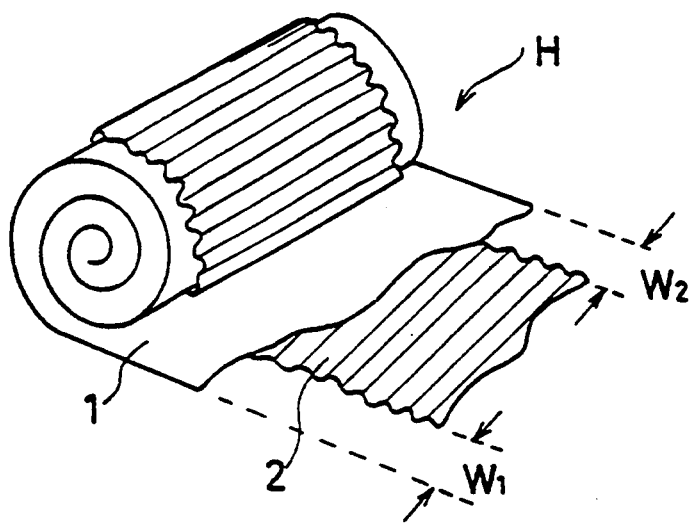
FIG. 1 schematically illustrates the construction of a honeycomb carrier body according to a first embodiment of the present invention.

As has been described above, it is extremely important to provide an automotive exhaust gas cleaning device, which uses a metal-made honeycomb carrier body, with sufficient durability against deforming force which is produced based on expansion and stress (strain) under heat.

A metal-made, exhaust gas cleaning device of the above-described type is exposed to a severe thermal environment even during running, to say nothing of such an alternating thermal load of a heating/cooling cycle as observed during an operation and at a stop and a subsequent re-start. Its durability against heat is therefore an extremely important theme.

With the foregoing in view, conditions during running of an automotive vehicle will next be considered. An exhaust gas cleaning device is exposed to higher temperatures at a central part thereof than at a peripheral part thereof because of a difference in the flow velocity distribution of exhaust gas, that is, a difference in flow velocity between the central part and the peripheral part and also catalytic reactions (exothermic reactions) of exhaust gas induced by an exhaust gas cleaning catalyst, such as Pt, Pd and/or Rh, carried on surfaces of the honeycomb carrier body. For example, the temperature of an exhaust gas cleaning device of this type generally ranges from 500° C. to 800° C. but may arises to 1,100° C. or so where HC (hydrocarbons) are exhaust abundantly.

Here, the temperature gradient inside the honeycomb carrier body will be discussed in detail in the radial direction of the honeycomb carrier body. The temperature difference between the outer periphery of the honeycomb carrier body and a portion of the honeycomb carrier body, said portion being located slightly inside the outer periphery, is substantially greater than a temperature difference around the central part of the honeycomb carrier body. A still greater difference is actually observed because the outer peripheral wall of the honeycomb carrier body is directly exposed to the external atmosphere and or the honeycomb carrier body is secured in a cylindrical metallic casing which is exposed to the external atmosphere and rain water.

In the exhaust gas cleaning device constructed of the metal-made honeycomb carrier body and the metal-made casing, strong deforming force based on thermal expansion or stress therefore, which deforming force may hereinafter be called "deforming force under heat" or "thermal deforming force", propagates to and concentrates near the outer peripheral wall of the honeycomb carrier body, as heat propagates from the high-temperature-side central part of the honeycomb carrier body to the region near the low-temperature-side outer peripheral wall of the honeycomb carrier body, namely, in the radial direction of the honeycomb carrier body.

The large deforming force produced based on the heat propagated in the radial direction of the honeycomb core body causes the component members of the honeycomb carrier body to buckle in the course of its propagation, to separate from each other along the passage of time even when the component members are firmly fixed together at points of contact therebetween, or to crack or break. These deleterious effects become significant especially near the outer peripheral wall of the honeycomb carrier body, where the thermal deforming force concentrates, notably at both end portions near the outer peripheral wall of the honeycomb carrier body at which end portions such deforming force concentrates and accumulates.

The deleterious effects of the above-described deforming force produced by heat are not limited to the part of the metal-made honeycomb carrier body but extend to faces of contact between the outermost peripheral wall of the honeycomb carrier body and the inner peripheral wall of the metallic casing. The state of fixed securement between the outer peripheral wall of the honeycomb carrier body and the inner peripheral wall of the metallic casing is therefore lost by the large thermal deforming force, so that a separated state is induced. Namely, separation occurred in the end portions near the outer peripheral wall of the honeycomb carrier body, at which end portions thermal stress concentrates and accumulates, propagates in the axial direction of the honeycomb carrier body, resulting in the worst situation that the honeycomb carrier body and the metallic casing are completely detached from each other.

To eliminate or reduce the above-described drawbacks such as separation, it is therefore indispensable to adopt means for effectively absorbing and reducing deforming force which is produced based on thermal expansion or thermal stress in the structure of the honeycomb carrier body, especially in the axial and radial directions of the honeycomb carrier body.

From the above-described viewpoint, the present invention has adopted, as the construction of the honeycomb carrier body, the construction that one of a planar band and a corrugated band as component members of the honeycomb carrier body extends outwardly relative to the other band at at least one end portion of the honeycomb carrier body in order to effectively prevent cracks and breakage in the component members of the honeycomb carrier body—which cracks and breakage would otherwise take place in end portions of the honeycomb carrier body, especially in end portions near the outer peripheral wall of the honeycomb carrier body and would cause a reduction in durability—and hence to provide the honeycomb carrier body with improved durability.

Certain preferred embodiments of the metal-made honeycomb carrier body according to the present invention will hereinafter be described in detail with reference to the accompanying drawings. It is however borne in mind that the present invention is not limited to or by the illustrated embodiments.

A metal-made honeycomb carrier body H according to the present invention is a principal element in such exhaust gas cleaning device A as shown in FIG. 6 through FIG. 11.

As is illustrated in each of FIG. 6 through FIG. 11, the exhaust gas cleaning device A is constructed of the metal-made honeycomb carrier body H and a metal-made casing C open at opposite ends thereof to accommodate and fix the honeycomb carrier body H therein.

Structural details of the honeycomb carrier body employed in the exhaust gas cleaning device A in each of FIG. 6 through FIG. 11 will be described subsequently.

The honeycomb carrier body H according to the first embodiment of the present invention will first be described with reference to FIG. 1.

The honeycomb carrier body H shown in FIG. 1 has been fabricated by superposing a planar band 1 made of a heat-resistant metal sheet and a corrugated band 2 made from a similar metal sheet one over the other in a contiguous relation and then rolling them together into a spiral form. Principal features of the honeycomb carrier body H according to the first embodiment of the present invention reside in that the corrugated band 2 has a narrower width than the planar band 1 and, upon fabrication of the honeycomb carrier body H of the rolled type, the corrugated band 2 is arranged with both longitudinal edges thereof set back over predetermined lengths $W_1$, $W_2$ from their corresponding ends of the honeycomb carrier body H. In other words, the honeycomb carrier body H is characterized in that, at each axial end of the honeycomb carrier body H, the planar band 1 is arranged extending outwardly over the predetermined length $W_1$ or $W_2$ relative to the corrugated band 2.

At each end of the honeycomb carrier body H according to the first embodiment of this invention as illustrated in FIG. 1, the length $W_1$ or $W_2$ over which the planar band 1 extends outwardly relative to the corrugated band 2 can be set at any value as desired.

In FIG. 1, the planar band 1 extends outwardly relative to the corrugate band 2 at each end of the honeycomb carrier body H. The present invention is not limited to this particular construction.

In the honeycomb carrier body H according to the first embodiment of this invention, the planar band 1 may be arranged, for example, extending outwardly over the predetermined length $W_1$ relative to the corrugated band 2 at only one end of the honeycomb carrier body H. In this modification, from the viewpoint of reinforcement of an end portion on an upstream side as viewed in the direction of an exhaust gas stream and further from the viewpoint of a merit brought about from brazing of both the bands 1, 2 at each end portion of the honeycomb carrier body H, said merit being to be described in detail with reference to FIGS. 4(a) to 5(b), it is preferred to form the honeycomb carrier body H in the above-described structure at the upstream-side end as viewed in the direction of the exhaust gas stream.

Figure 2:
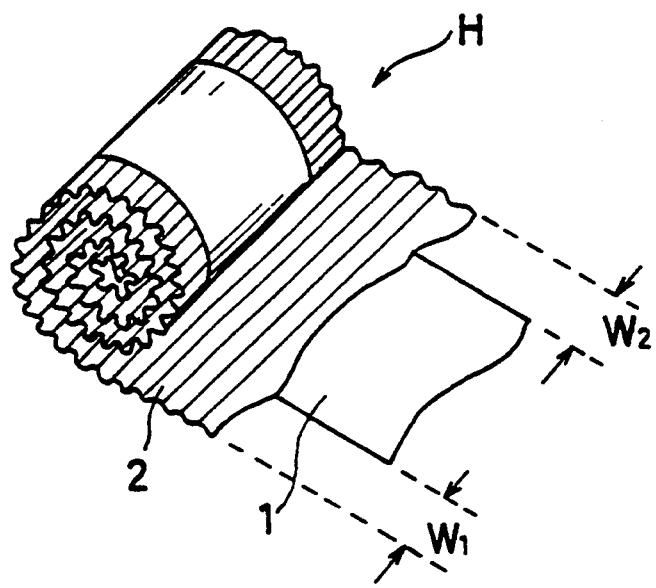
FIG. 2 schematically shows the construction of a honeycomb carrier body according to a second embodiment of the present invention.

With reference to FIG. 2, a description will next be made of the honeycomb carrier body H according to the second embodiment of the present invention. The biggest difference of the honeycomb carrier body H of the second embodiment from the honeycomb carrier body of the first embodiment shown in FIG. 1 resides in that the dimensional relationship between the planar band 1 and the corrugated band 2 is opposite. They are identical to each other in the remaining technical features. Namely, in the second embodiment shown in FIG. 2, the corrugated band 2 is arranged extending over a predetermined length $W_1$ or $W_2$ relative to the planar band 1 at each end of the honeycomb carrier body H.

Figure 3:
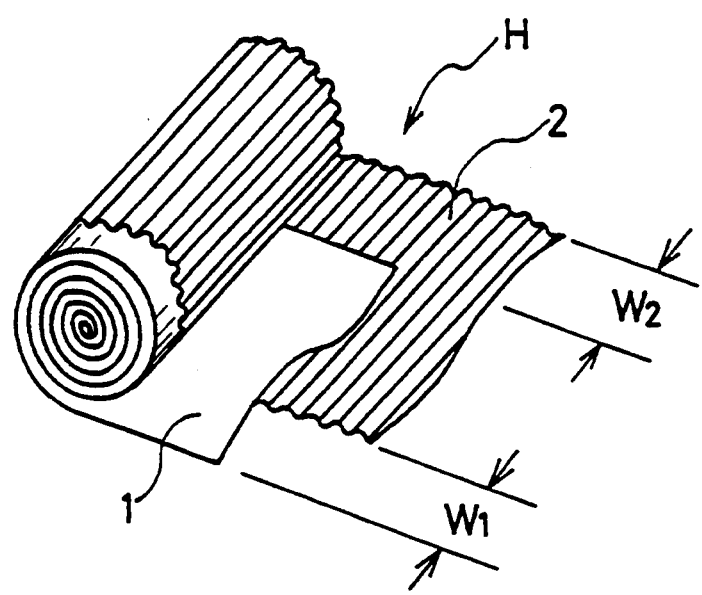
FIG. 3 schematically depicts the construction of a honeycomb carrier body according to a third embodiment of the present invention.

The honeycomb carrier body H according to the third embodiment of the present invention is depicted in FIG. 3. A planar band 1 and a corrugated band 2 are arranged in a staggered relationship so that one of the bands 1, 2 extends outwardly by a desired width $W_1$ or $W_2$ relative to the other band at one of opposite ends of the honeycomb carrier body H but the other band extends outwardly by a desired width $W_2$ or $W_1$ relative to the aforementioned one band at the other end of the honeycomb carrier body H. The bands 1, 2 so arranged are then rolled into the honeycomb carrier body H.

Usable examples of the planar and corrugated bands in the present invention include bands of 0.02 mm to 0.1 mm in thickness, which are made of a chromium steel (chromium content: 13–25%), a heat-resistant stainless steel such as Fe-20%Cr-5%Al, or a heat-resistant stainless steel formed by adding to such a stainless steel a rare earth element to improve the heat and oxidation resistance. Use of an Al-added stainless steel as each of the bands is preferred because the addition of Al can improve the heat and oxidation resistance and, when subjected to heat treatment, $\alpha$-$Al_2O_3$ in various forms such as whiskers and mushrooms appears on the surfaces of each band and facilitates firm deposition of a wash coat on the surfaces for carrying thereon an exhaust gas cleaning catalyst.

Needless to say, it is also possible to use, as the planar band, a planar band with minute waves (microwaves or micro-corrugations) formed thereon at a small wave-height and a small pitch.

At each axial end near the outer peripheral wall of the honeycomb carrier body shown in each of FIG. 1 through FIG. 3, large deforming force concentrates and accumulates especially based on thermal stress. The planar band (or the corrugated band) is arranged extending outwardly relative to the corrugated band (or the planar band) at each axial end near the outer peripheral wall of the honeycomb carrier body H. It is therefore possible to permit effective dissipation of the deforming force through the outwardly extended portion of the planar band (or the corrugated band).

This is attributed to the existence of a free end portion in the form of the outwardly extended portion. In the course of propagation of the deforming force based on propagation of thermal stress in radial and axial directions from a central part of the honeycomb carrier H, the free end portion is considered to play an important role for the absorption and dissipation of the thermal stress.

In addition, the adoption of the above-described construction in the honeycomb carrier H of this invention can bring about an additional merit upon brazing the component members of the honeycomb carrier body H.

Figure 4:
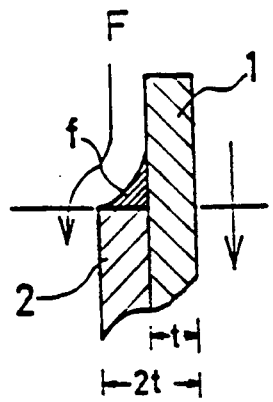
FIGS. 4(a) and 4(b) are enlarged fragmentary axial cross-sectional views of the honeycomb carrier body according to the first embodiment of the present invention as assembled and brazed in an exhaust gas cleaning device, and illustrate the brazed constructions of opposite end portions of the honeycomb carrier body.
Figure 4:
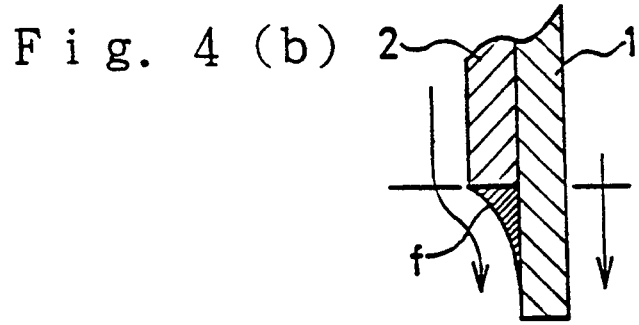
Figure 5:
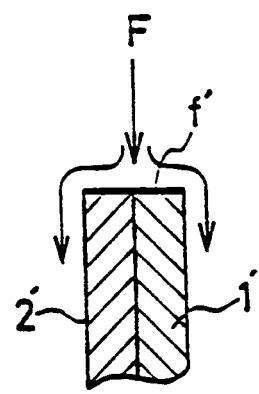
FIGS. 5(a) and 5(b) are enlarged fragmentary axial cross-sectional views of a conventional honeycomb carrier body as assembled and brazed in an exhaust gas cleaning device, and illustrate the brazed constructions of opposite end portions of the honeycomb carrier body.
Figure 5:
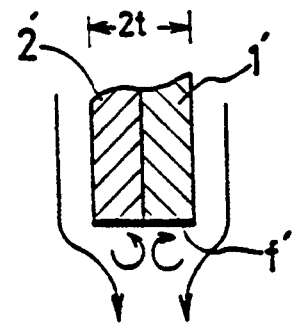
Figure 6:
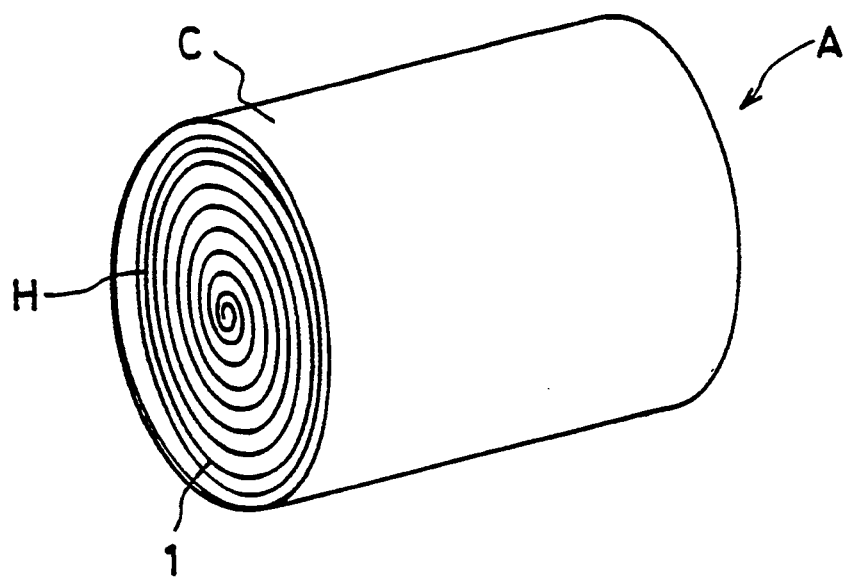
FIG. 6 is a perspective view of a first example of an exhaust gas cleaning device making use of a honeycomb carrier body of the present invention.

This will next be described with reference to FIG. 4(a) through FIG. 5(b). FIGS. 4(a) and 4(b) are the enlarged fragmentary axial cross-sectional views of the exhaust gas cleaning device A which is shown in FIG. 6 and has been fabricated by brazing and fixing the honeycomb carrier body according to the first embodiment of the present invention in the casing C. FIG. 4(a) illustrates one end portion of the honeycomb carrier body H, said end portion being located on an upstream side as viewed in the direction of an exhaust gas flow F, and an opposite end portion of the same honeycomb carrier body H, said opposite end portion being located on a downstream side as viewed in the direction of the exhaust gas flow F.

Since the planar band 1 is arranged extending outwardly by the predetermined length relative to the corrugated band 2 on both the end portions of the honeycomb carrier body H, the wall thickness of each exhaust gas passage (cell) varies in stages in the direction of the exhaust gas flow. It is to be noted that the thickness of each of the planar band and the corrugated band is indicated by "t" in the drawings. Upon brazing both the bands subsequent to application of a brazing material thereto, a fillet f (an accumulation of the brazing material) in the form of a curved, substantially triangular configuration as viewed in cross-section is formed at each point of contact between the bands 1 and 2. The fillets f in such a curved form serve as guides for the exhaust gas stream F and smoothly stratify the direction of the exhaust gas stream at both inlet and outlet sides of the honeycomb carrier body, thereby making it possible to prevent occurrence of substantial changes in the stream or occurrence of vortices and hence to avoid an increase in back pressure (flow resistance). The fillets are therefore preferred for the prevention of a reduction in the efficiency of an internal combustion engine.

FIGS. 5(a) and 5(b), on the other hand, correspond to FIGS. 4(a) and 4(b) and are fragmentary axial cross-sectional views of the conventional honeycomb carrier body.

In the conventional art, each end face of the honeycomb carrier body is formed flush by a planar band 1' and a corrugated band 2' so that, as illustrated in the drawings, the thickness of each wall so formed is twice (2t) as much as the thickness of each band and no fillet is formed practically. Since no fillet is practically formed in the conventional honeycomb carrier body, an exhaust gas stream F hits the wall of the thickness twice (2t) as much as each band at an inlet so that the direction of the exhaust gas stream is changed substantially. The passage area suddenly expands at an outlet so that the exhaust gas stream partly flows backwards to produce swirls (Karman's vortices). As a result, the back pressure (flow resistance) becomes higher, leading to the drawback that the efficiency of an internal combustion engine is lowered.

The honeycomb carrier body H according to the present invention is inserted and fixed in the metallic casing C so that the metal-made exhaust gas cleaning device A is produced.

The present invention can be applied to honeycomb carrier bodies H of various structures. A description will next be made in this respect.

Examples of the metal-made exhaust gas cleaning device A include those illustrated in FIG. 6 through FIG. 11, respectively.

A honeycomb carrier body H of the metal-made exhaust gas cleaning device shown in FIG. 6 is of the rolled type, which has been fabricate by superposing a planar band 1 and a corrugated band 2 one over the other in a contiguous relation and then rolling them together in a spiral form (see FIG. 1). The dimensional relationship between the bands 1 and 2 at each end of the honeycomb carrier body H is as shown in FIG. 1, so that its description is omitted herein.

As a result of the rolling of both the bands 1, 2 into stacked layers, a number of network-patterned gas flow passages (cells) 3 are automatically formed as passages for exhaust gas.

Figure 7:
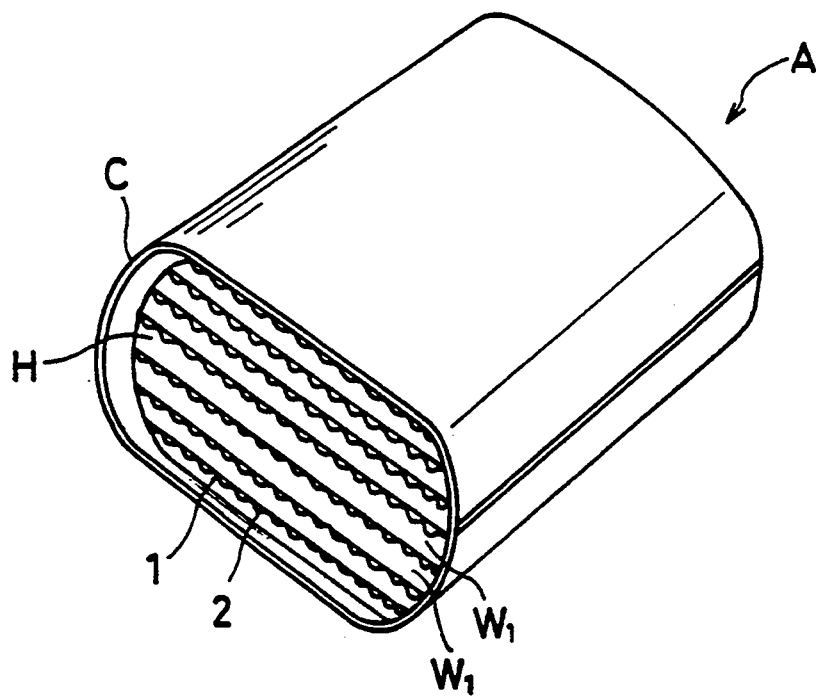
FIG. 7 is a perspective view of a second example of an exhaust gas cleaning device making use of a honeycomb carrier body of the present invention.

A honeycomb carrier body H in the metal-made exhaust gas cleaning device illustrated in FIG. 7 is of the stacked layer type, which has been fabricated by alternately stacking planar bands 1 and corrugated bands 2 in a contiguous relation one over another, in other words, by alternately stacking them in layers.

Figure 8:
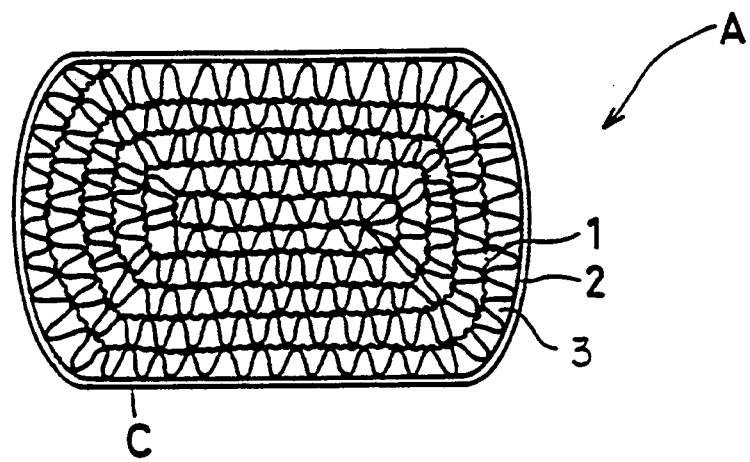
FIG. 8 is a front view of a third example of an exhaust gas cleaning device making use of a honeycomb carrier body of the present invention.

A honeycomb carrier body H in the metal-made exhaust gas cleaning device depicted in FIG. 8 is a modification of the rolled type exhaust gas cleaning device shown in FIG. 6, and is of a racetrack (oval) shape as viewed in cross-section. It has been fabricated by rolling a planar band 1 and a corrugated band 2 into a composite body with a large-diameter cavity formed centrally therein and then causing the cavity to collapse under pressure into a racetrack shape as viewed in cross-section. In the honeycomb carrier body H depicted in FIG. 8, the planar band 1 is provided with micro-corrugations.

Figure 9:
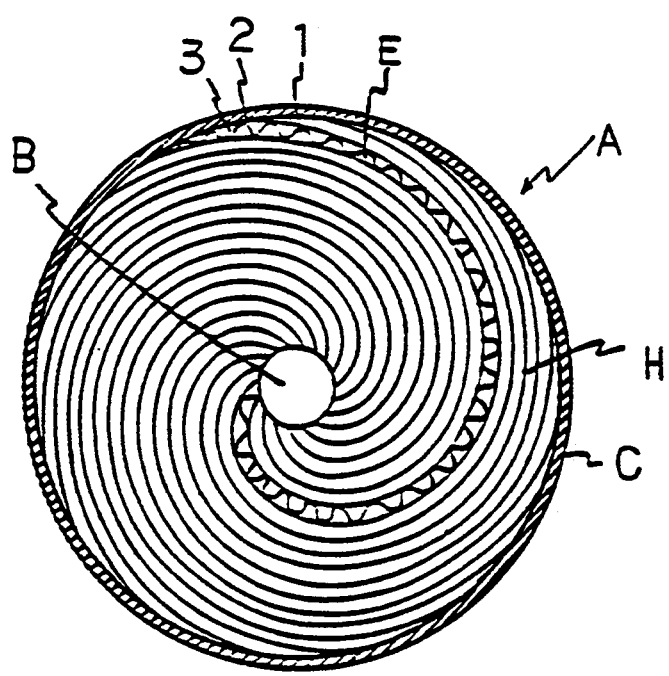
FIG. 9 is a cross-sectional view of a fourth example of an exhaust gas cleaning device making use of a honeycomb carrier body of the present invention.

A honeycomb carrier body H in the metal-made exhaust gas cleaning device illustrated in FIG. 9 is of the radial type, which has been fabricated by bringing a planar band 1 and a corrugated band 2 into a contiguous relation to form a cleaning element E and causing a desired number of such cleaning elements E to extend radially from a fixed rod B as an origin. Except for the corrugated band 2 of one of the cleaning elements E, the corrugated bands 2 of all the remaining cleaning elements E are indicated like planar bands for the sake of simplification.

Figure 10:
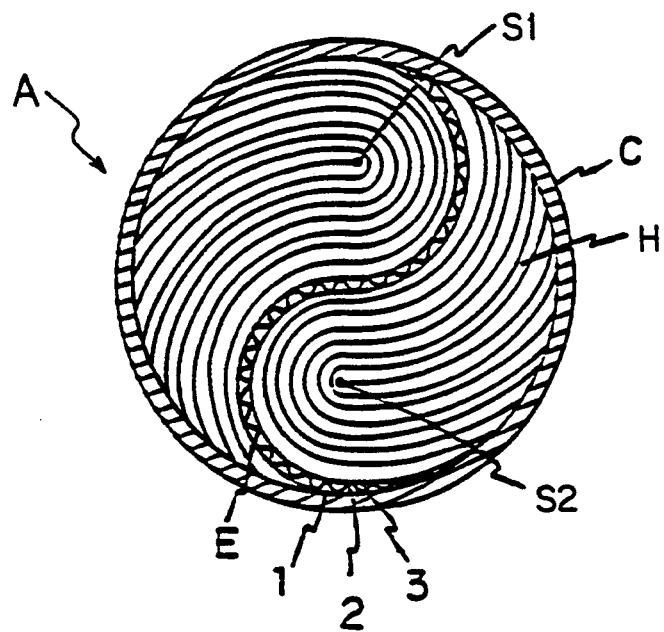
FIG. 10 is a cross-sectional view of a fifth example of an exhaust gas cleaning device making use of a honeycomb carrier body of the present invention.

A honeycomb carrier body H of the metal-made exhaust gas cleaning device shown in FIG. 10 can be fabricated as will be described next. A planar band 1 and a corrugated band 2 are brought into a contiguous relation so that a cleaning element E is formed. A desired number of such cleaning elements E are stacked one over another into a multi-layered stack with opposite outermost walls thereof being made of the planar bands 1, respectively. Jigs for rolling work (rolling rods) are then arranged on two fixed points $S_1$, $S_2$ which are set on the upper and lower outermost walls, respectively. The multi-layered stack are then rolled about the rolling rods, whereby the S-shaped honeycomb carrier body H is fabricated with each cleaning element E having been formed in a substantially S-shaped configuration. As a modification of this honeycomb carrier body H, it is also possible to use a honeycomb carrier body which is known in the present field of art and is of the type that two huge commas are so united as to make a perfect circle. The honeycomb carrier body of this modification can be fabricated by furnishing three stacks and then rolling them about three rolling rods to have them formed into three huge commas so united as to make a perfect circle.

Figure 11:
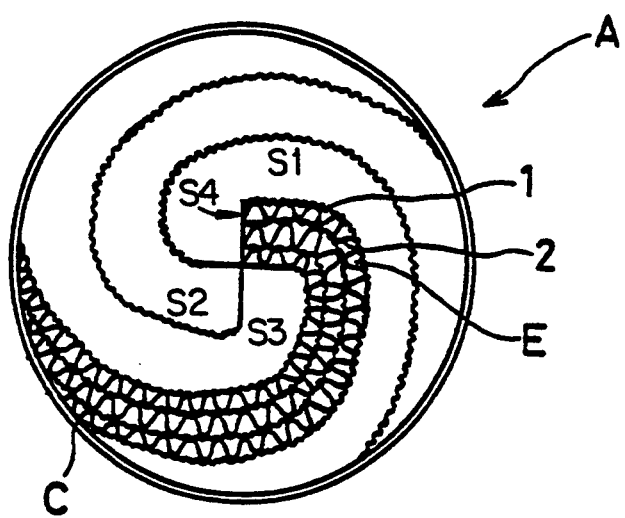
FIG. 11 is a front view of a sixth example of an exhaust gas cleaning device making use of a honeycomb carrier body of the present invention.

A honeycomb carrier body H of the metal-made exhaust gas cleaning device depicted in FIG. 11 can be fabricated as will be described next. A planar band 1 and a corrugated band 2 are brought into a contiguous relation to form a cleaning element E. A desired number of such cleaning elements E are stacked one over another to form a stack with opposite outermost walls thereof being made of the planar bands 1, respectively. Four of such stacks $S_1$–$S_4$ are held together at one end thereof by a centrally-arranged holding jig (not shown) and are then rolled in the same direction around the holding jig. It is to be noted that FIG. 11 shows in detail the construction of only one of the stacks and that of the cleaning elements E forming the stack. Incidentally, each planar band 1 is provided with microcorrugations.

In the honeycomb carrier body H of the above-described type, the respective stacks $S_1$–$S_n$ (n: desired number of stacks) are joined together in the pattern of X (in a swastika pattern) at a central part of the honeycomb carrier body H so that the honeycomb carrier body H is commonly called an "X-patterned (or swastika-patterned) honeycomb carrier body".

The front shape of the X-patterned honeycomb carrier body can vary in various ways depending on the shape of the respective stacks $S_1$–$S_n$. For example, the front shape of the X-patterned honeycomb carrier body takes a substantially circular, square or oval shape when the respective stacks $S_1$–$S_n$ are in the form of a rectangle, trapezoid or parallelogram in side view.

In each of the metal-made exhaust gas cleaning device A described above, no particular limitation is imposed on the shape of the metallic casing C in which the honeycomb carrier body H is inserted and fixed, provided that the metallic casing C is open at opposite ends thereof. The metallic casings C shown in FIG. 6 through FIG. 11, respectively, include both metallic casings having a circular cross-section and metallic casings having a racetrack-shaped (oval) cross-section. It is however to be noted that the present invention is not limited to the use of such metallic casings. For example, an exhaust gas cleaning device can be constructed using a metallic casing of a substantially triangular cross-section so that the exhaust gas cleaning device can be accommodated in a space in a lower part of a vehicle body.

As a material for such metallic casings, it is possible to use either a heat-resistant steel of the same type as that employed for the honeycomb carrier body or a material having high heat and corrosion resistance. As an alternative, it is also possible to use a double-layered structure in which an outer layer is made of a metal material higher in heat and corrosion resistance than a metal material of an inner layer, specifically a clad steel made of a ferritic stainless steel as an inner layer and an austenitic stainless steel as an outer layer.

EXAMPLES

The present invention will hereinafter be described in detail on the basis of the following Examples. It is however borne in mind that the present invention is not limited to or by the following Examples.

(1) Planar band and corrugated band:

The following planar and corrugated bands made of a heat-resistant steel of Fe-20%Cr-5%Al-0.02%Ce were employed.
 (i) Planar band:
  Thickness: 50 μm
  Width: 70 mm
 (ii) Corrugated band:
  Thickness: 50 μm
  Width: 60 mm
  Pitch: 4.2 mm
  Ridge height: 1.5 mm (2) Fabrication of a honeycomb carrier body:

As shown in FIG. 1, the planer band and the corrugated band were then superposed one over the other ($W_1=W_2=5$ mm) and rolled together into layers so that a honeycomb carrier body having an outer diameter of 70 mm and axially defining a number of network-patterned gas flow passages was fabricated. During the fabrication of the honeycomb carrier body by the rolling operation, the corrugated shapes of both the bands were not deformed so that it was possible to efficiently roll them into the multi-layered composite body having the predetermined cell concentration.

Next, the honeycomb carrier body was inserted in a metallic casing having an inner diameter of about 70 mm and made of a heat-resistant steel (JIS G4312 SUH310S). Both ends of the honeycomb carrier body and their adjacent portions (regions up to 10 mm from the respective ends) were dipped in a slurry of a nickel-base brazing material and, after the slurry was dried, the honeycomb carrier body was heat-treated in a vacuum furnace, whereby the honeycomb carrier body was brazed and fixed at points of contact between the bands and also at points of contact between the honeycomb carrier body and the metallic casing.

On the exhaust gas cleaning device fabricated as described above, catalyst carrying layers were then formed as will be described next. Namely, the surfaces of each band forming the honeycomb carrier body were coated with a slurry of activated alumina ($\lambda$-$Al_2O_3$) powder and an alumina sol. The honeycomb carrier body so coated was then heat-treated at 600° C. so that catalyst carrying layers were formed.

(3) Evaluation of performance:

The above-described exhaust gas cleaning device provided with the catalyst carrying layers was subjected to a quick heating and cooling test (burner spalling test) consisting of 100 cycles each ranging from room temperature to 900° C. and also to a vibration test. No buckling, cracking or breakage was observed at any part of the component members of the honeycomb carrier body. Further, neither separation nor detachment was observed at any point of contact. In addition, neither falling nor separation of any catalyst carrying layer was observed.

What is claimed is:

1. In a metal-made honeycomb carrier body for carrying thereon an exhaust gas cleaning catalyst, said carrier body having an upstream side, a downstream side, a central axis, and opposite axial ends and being formed by superposing a planar metal band made of a metal sheet and a corrugated band made of another metal sheet one over the other in a contiguous relationship to define a plurality of network-patterned gas flow passages which extend continuously between said opposite axial ends in a direction parallel to the central axis of said resulting honeycomb carrier body, the improvement wherein, one of the planar band and the corrugated band extends outwardly relative to the other band at one of the opposite axial ends of the honeycomb carrier body and each of the plurality of network-patterned gas passages of said honeycomb carrier body are equal in length.

2. A metal-made honeycomb carrier body of claim 1, wherein the planar band extends outwardly relative to the corrugated band at one axial end of the honeycomb carrier body, said one axial end being to be located on said upstream side as viewed in the direction of an exhaust gas stream.

3. A metal-made honeycomb carrier body of claim 1, wherein the corrugated band extends outwardly relative to the planar band at one axial end of the honeycomb carrier body, said one axial end being to be located on said upstream side as viewed in the direction of an exhaust gas stream.

4. A metal-made honeycomb carrier body of claim 1, wherein the planar band extends outwardly relative to the corrugated band at each of the opposite axial ends of the honeycomb carrier body, said opposite axial ends being to be located on said upstream and downstream sides as viewed in the direction of an exhaust gas stream, respectively.

5. A metal-made honeycomb carrier body of claim 1, wherein the corrugated band extends outwardly relative to the planar band at each of the opposite axial ends of the honeycomb carrier body, said opposite axial ends being to be located on said upstream and downstream sides as viewed in the direction of an exhaust gas stream, respectively.

6. A metal-made honeycomb carrier body of claim 1, wherein the planar band extends outwardly relative to the corrugated band at one of the opposite axial ends of the honeycomb carrier body and the corrugated band extends outwardly relative to the planar band at the other axial end of the honeycomb carrier body.

7. A metal-made honeycomb carrier body of claim 1, wherein the planar band and the corrugated band are brazed together at at least some of points of contact therebetween.

* * * * *